United States Patent [19]

Dunn

[11] Patent Number: 4,574,480
[45] Date of Patent: Mar. 11, 1986

[54] ROTARY SHEAR CUTTER

[75] Inventor: Lawrence M. Dunn, Northbrook, Ill.

[73] Assignees: Ronald L. Rusch, Lincolnshire, Ill.; Grodon L. Jacobson, Bernardsville, N.J.

[21] Appl. No.: 529,396

[22] Filed: Sep. 6, 1983

[51] Int. Cl.$^4$ .................. B26B 13/00; B26B 13/06; B26B 19/14

[52] U.S. Cl. .................................... 30/240; 30/265; 30/317

[58] Field of Search ............ 30/240, 263, 265, 292, 30/294, 287, 317; 285/298, 165; 138/120

[56] References Cited

U.S. PATENT DOCUMENTS

| | | | |
|---|---|---|---|
| 255,102 | 3/1882 | Danheim | 30/265 |
| 1,720,305 | 7/1929 | Tjernlund | 30/265 |
| 3,076,263 | 2/1963 | Musto | 30/317 |
| 3,380,158 | 4/1968 | Du Bois | 30/265 |
| 3,906,629 | 9/1975 | Fuchs, Jr. | 30/265 |

FOREIGN PATENT DOCUMENTS

| | | | |
|---|---|---|---|
| 249537 | 6/1911 | Fed. Rep. of Germany | 30/265 |
| 32236 | 10/1919 | Norway | 30/265 |

*Primary Examiner*—Paul A. Bell
*Assistant Examiner*—Paul M. Heyrana, Sr.
*Attorney, Agent, or Firm*—Russell E. Hattis

[57] ABSTRACT

A manual rotary-shear cutter for severing sheet metal stock has a cutting head and a handle joined by an extension tube engageable with and selectively retained at sites formed on the cutting head and handle. A series of preformed apertures spaced along the extension tube allows shortening of the overall length of the cutter by severing the extension tube and aligning the apertures nearest the end of the extension tube with passages formed at such sites, inserting fasteners therethrough, and releasably securing such fasteners. A connecting sleeve may also be provided to join individual extension tube segments, thereby forming a longer extension. Flanges formed integrally with the head define mounting sites for the cutting blades, and overlap the blade edges, to protect the cutting edges of the blades.

9 Claims, 5 Drawing Figures

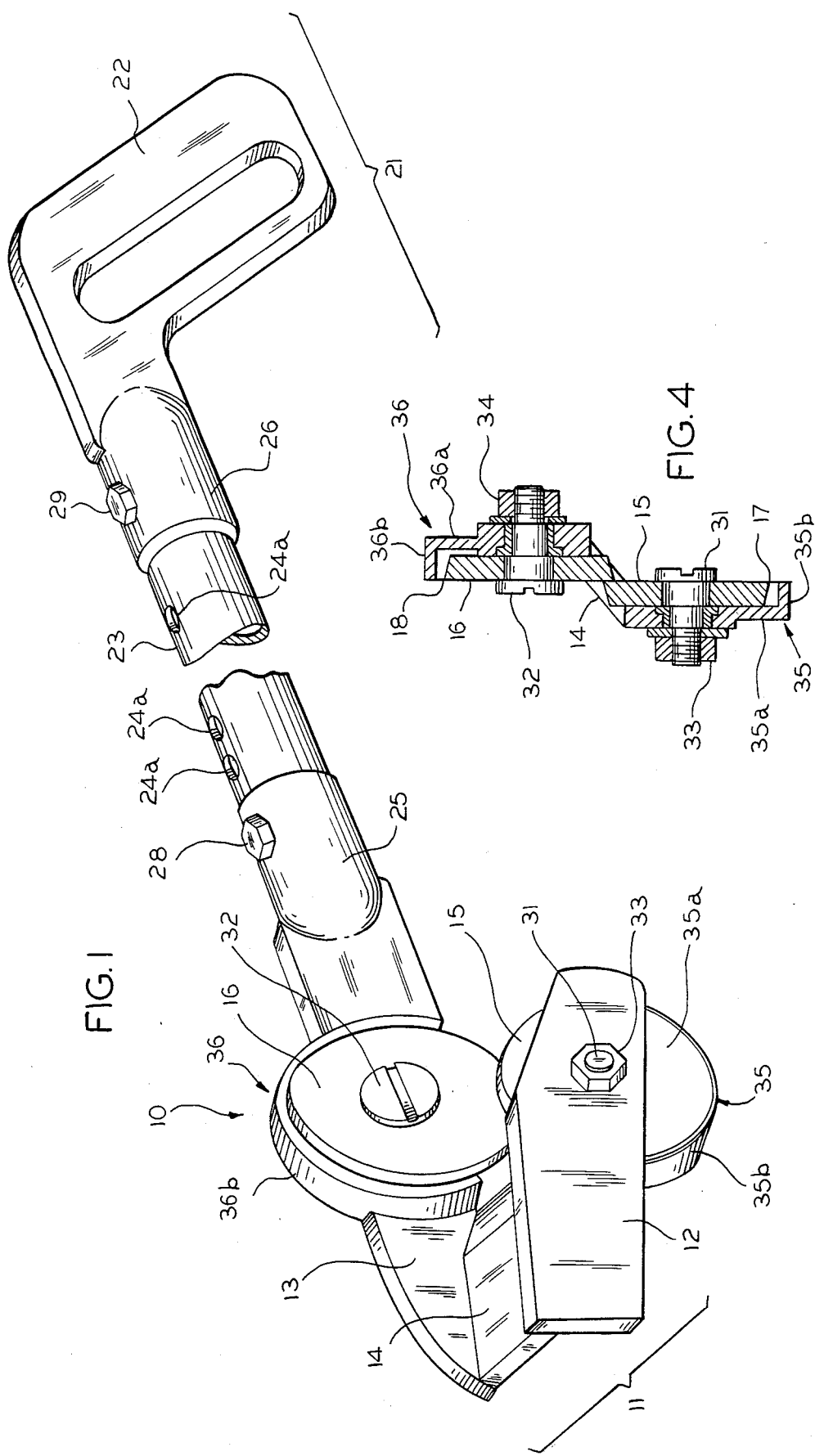

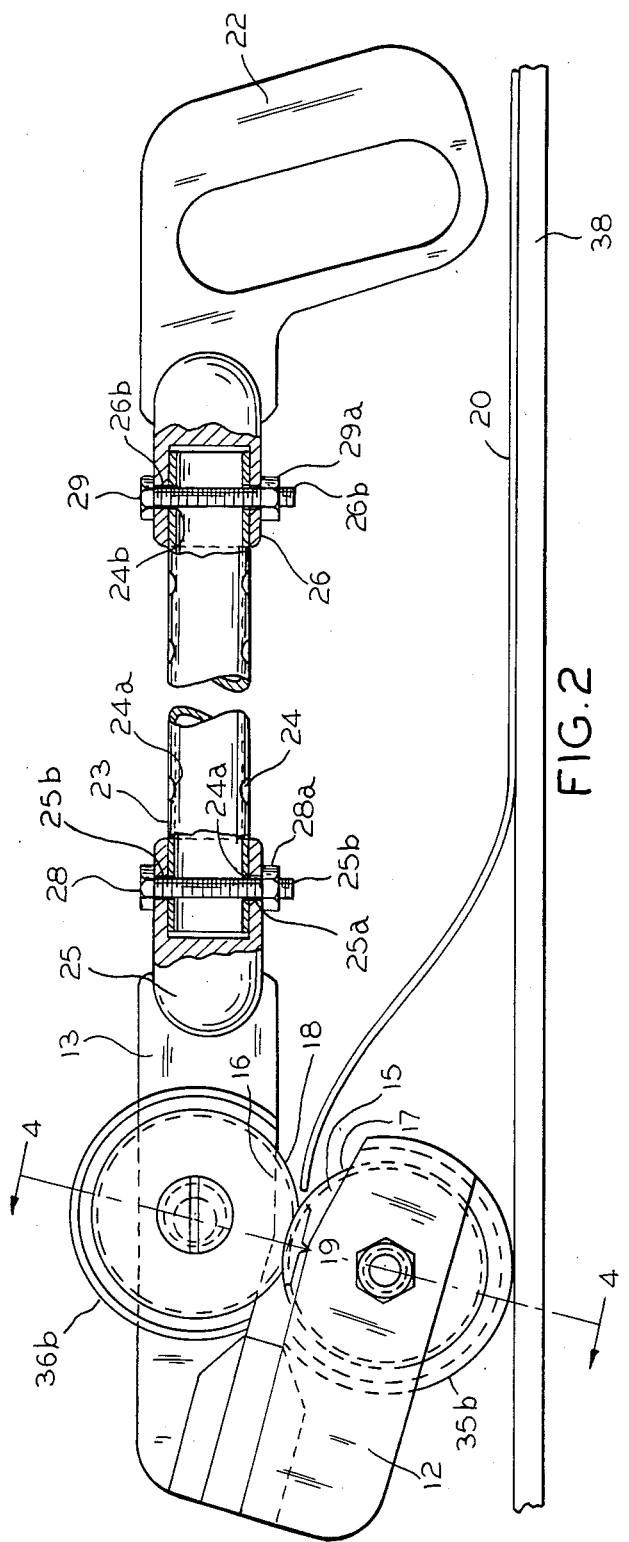
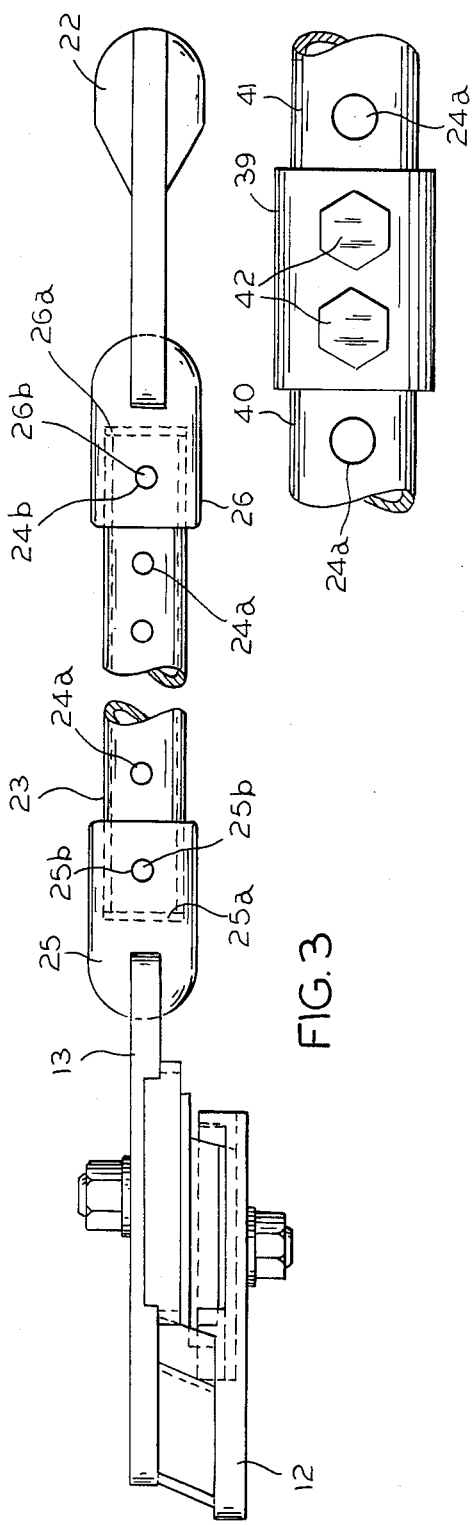

ROTARY SHEAR CUTTER

My invention relates generally to material cutting and shaping tools and, more particularly, to a manually operated, hand-held shear for use in severing sheet stock, such as sheet metal.

BACKGROUND OF THE INVENTION

In the metalworking art, it is known to employ metal-cutting tools which utilize round cutting blades or cutting wheels, each such blade or wheel having a sharpened cutting edge ground about its outer periphery. The blades are generally arranged in pairs to position the cutting edges proximate one another and to slightly overlap the cutting edges thereof. The sheet material to be cut is passed between the cutting edges, which "engage" the material and sever it. Due to the relative thinness of the cutting edges, the pressure with which the sheet material engages the cutting blades creates force sufficient to easily sever or shear the sheet material. Unlike other metal cutters, such as rotary nibblers, which create ribbons of waste or scrap material when used, the rotary shear cutters with which the present invention is involved generally create no such waste or scrap, making neat, accurate cutting more possible. While such cutting blades or wheels are generally arranged in opposed pairs, they may take on other configurations as well.

The present invention concerns itself with the type of shear cutter that is generally characterized as portable and hand-operable, rather than those types of cutters utilizing motor-driven blades, or that type of cutting machinery housed in large, permanently-positioned cabinets where the stock to be shaped is brought to the machine rather than vice versa. A preferred and intended manner of use for the present invention contemplates laying the sheet stock on a supporting surface, positioning the cutter at the farthest edge of the sheet stock, and drawing the cutter toward the user, shearing the sheet stock as the cutter travels.

Known cutters employing these mechanical principles have suffered from various shortcomings which limit their usefulness and increase their operating expense. Among these shortcomings is the expense and inconvenience suffered when the cutter is manufactured as a unitary structure, making it difficult and expensive, or even impossible to repair. If the handle breaks, the cutter may have to be discarded or may have to be welded or otherwise patched back together in a temporized form of repair. Another problem is incurred when the length and/or shape of the handle makes it inconvenient or awkward to use the cutter for a particular application. One solution to such problems is to keep a stock of cutters on hand having handles of varied lengths and shapes, a solution which also calls for a higher capital outlay.

Prior cutters illustrated in issued U.S. Patents demonstrate these shortcomings. U.S. Pat. No. 4,283,853, issued Aug. 18, 1981, shows a unitary cutting head frame and handle construction to which the cutting wheels are attached, with no provision for varying the distance between its cutting head frame and the handle. U.S. Pat. No. 769,081, issued Aug. 30, 1904 also shows a cutter with a unitary cutting head and handle structure to which the cutting wheels are affixed.

Similar constructions are shown in U.S. Pat. No. 1,511,892, issued Oct. 14, 1924, and U.S. Pat. No. 2,276,365, issued Mar. 17, 1942. The unitary attachment shown in these patents is self-limiting in the manner described hereinabove.

BRIEF DESCRIPTION OF THE INVENTION

In accordance with a preferred form of the features of the present invention, the cutting head frame, which carries the cutting wheels, and the handle, are separate, spaced apart elements interconnected by a connecting tube, sometimes referred to as a connecting means, the ends which are removably connected to the cutting head and the handle. The connecting means most desirably is made of cylindrical metal tubing and interfits with extensions formed on the cutting head frame and handle. In the most preferred form of the invention, these extensions form sockets extending from the cutting head frame and handle which telescopically receive the ends of the tubular connecting means. The ends of the connecting tube are joined to the socket-forming extensions of the cutting head frame and handle by suitable retaining means. These retaining means may be screws or bolts which pass through aligned apertures or passages in the socket-forming extensions and the connecting tube.

The connecting tube is readily severable to a desired length by suitable means, such as hack saws, tubing cutters, or the like. Along the length of said tubular or other connecting means there are attaching means formed which are identical to the attaching means initially located in the end portions of the tubular connecting means such that, as the connecting means are cut to a desired size, the identical attaching means at the new end or ends of the tubular connecting means allow attachment to the cutting head frame and handle as in the original, uncut connecting tube. The attaching means comprise pairs of aligned holes or apertures formed along the length of the tubular connecting means through which the fastening means are inserted as previously described.

Other aspects of the invention relate to the integral construction of the upper and lower member-forming portions of the cutting head and the integrally provided wheel guards particularly formed with and extending laterally from the frame members.

These, and further aspects of the present invention may better be understood by referring to the accompanying drawings.

BRIEF DESCRIPTION OF THE DRAWINGS

FIG. 1 is a perspective view of a preferred embodiment of cutter of the present invention;

FIG. 2 is a side view in partial section of the embodiment shown in FIG. 1;

FIG. 3 is a top plan view of the embodiment shown in FIG. 1 with the extension tube bolts removed therefrom;

FIG. 4 is a vertical sectional view taken along line 4—4 of FIG. 2; and

FIG. 5 is a partial elevational view showing a connecting sleeve used with a second preferred embodiment of the present invention.

DETAILED DESCRIPTION OF THE INVENTION

Referring to FIG. 1, the numeral 10 indicates generally a manually operable rotary shear cutter for severing sheet metal stock. As viewed in FIG. 1, cutter 10 includes a cutting head frame 11 comprising a first, or lower horizontally-extending arm 12, and a second, or upper horizontally-extending arm 13, laterally offset from arm 12. Arms 12 and 13 are joined by and integrally formed with a laterally-extending web 14. Arms 12 and 13 are sometimes referred in the claims as frame members.

A round, disk-shaped lower cutting blade 15 is rotatably mounted about a horizontal axis onto lower arm 12, and a round, disk-shaped upper cutting blade 16 is rotatably mounted upon upper arm 13. Blades 15 and 16 are preferably heavy-duty in construction. As best seen in FIGS. 2 and 4, cutting blades 15 and 16 are positioned to allow a slight vertical overlap of cutting edges 17 and 18 thereof which are centered about the outer peripheries of cutting blades 15 and 16, respectively. Blades 15 and 16 are also laterally offset, as seen in FIG. 4.

A shear zone, shown at 19 of FIG 2, is thus formed whereby the edge of sheet metal stock 20 engages cutting blades 15 and 16 simultaneously and is thereby severed as cutting head 11 is pulled across the sheet metal stock 20. Such an arrangement has been found to be particularly useful in cutting thin sheet aluminum stock (e.g. 0.006 in. to 0.032 in. thickness and 3 to 4 feet in width) effortlessly, conveniently, and faster than if conventional, powered cutters were used.

As seen in FIGS. 1 and 4, a preferred manner of mounting blades 15 and 16 to cutting head assembly 11 includes use of axle-forming mounting bolts 31 and 32 secured, respectively, by nuts 33 and 34. Such an arrangement allows for easy removal and replacement of blades 15 and 16 for repair, sharpening, or the like.

As best seen in FIGS. 1 and 4, lower arm 12 and upper arm 13 have blade guards 35 and 36, respectively, integrally formed thereon at the mounting sites for the cutting blades. The arms 12 and 13, web 14 and guards 35 and 36 may be formed by a single metal casting. The guard 35 comprises a vertically extending back plate 35a integral with and extending downward from lower arm 12 and terminates in a flange 35b covering a portion of blade 15. The flange 35b, integral with lower arm 12 and back plate 35a, extends about a major portion of the periphery of the cutting blade 15, such that the blade 15 is "nested" within guard 35, as seen in FIG. 4. Blade guard 36 is similar in construction and detail to the guard 35 and thus has a vertical back plate 36a terminating in a flange 36b covering the cutting portion of the blade 16.

In the preferred embodiment shown in FIG. 1, guards 35 and 36 are circular in configuration, and extend to cover about 75%, or 270°, of the periphery of blades 15 and 16, respectively, with the guards being discontinued to allow blades 15 and 16 to be exposed to form shear zone 19, shown in FIG. 2.

As seen in FIG. 2, when the sheet stock 20 to be severed is supported on a flat work surface, such as a work table top 38, guard 35 acts to protect blade 16 from contact with table top 38, thus preserving the sharpness of blade 15 and protecting table top 38 from cuts and mars. Guards 35 and 36 also help to protect the user when handling the cutter 10.

In order to facilitate use of the cutter 10, a handle unit 21 is provided (FIG. 1), having a handgrip portion 22. A preferred embodiment of the handle unit 21 is shown in FIG. 1. It should be understood that handle 21 can be formed in a wide variety of shapes and sizes as convenience and preference dictate.

In accordance with one aspect of the present invention, an extension tube 23 (referred to in the claims as connecting means) is releasably attachable to both the cutting head frame 11 and the handle unit 21. Preferred embodiments showing the connection of the extension tube 23 to the cutting head frame 11 and the handle unit 21 are shown, in various detail, in FIGS. 1-3.

In FIGS. 1-3, extension tube 23 is shown as formed in the shape of a cylindrical tube having a series of longitudinally-positioned, regularly-spaced laterally aligned aperture pairs 24a—24a (also referred to as attaching means) formed therealong. The cutting head frame 11 has a horizontal socket-forming extension 25 formed at the termination of upper arm 13, and defines a horizontally-extending open-ended cavity 25a sized to closely accommodate one end of extension tube 23. In like fashion, a second horizontal socket-forming extension 26 is formed as part of the handle unit 21, and defines an open-ended cavity 26a also sized to closely accommodate the other end of extension tube 23.

As best seen in FIG. 2, a preferred manner of anchoring extension tube 23 in socket-forming extensions 25 and 26 includes laterally formed passages or aperture 25b and 26b formed, respectively, through socket-forming extensions 25 and 26 which are registrable with apertures 24a—24a at the ends of the extension tube 23. Socket-forming extension passages 25b—25b and 26b—26b are sized and positioned to register with extension tube aperture pair 24a—24a. Thereafter a pin, screw, bolt, or other fastener means is inserted therethrough and anchored to prevent unwanted disengagement of extension tube 23 from the cutting head frame 11 and handle unit 22. In FIGS. 1 and 2, extension tube 23 is shown secured to socket-forming extension 25 by a bolt 28. In like fashion, a bolt 29 secures the other end of extension tube 23 to handle unit 21 at socket-forming extension 26.

FIG. 3 shows extension tube aperture pairs 24a—24a registered or aligned with the socket-forming extension passages 25b—25b and 26b—26b prior to the insertion of bolts 28 and 29. Bolts 28 and 29 are shown in FIG. 2 secured by threaded locknuts 28a and 29a or other known fastening devices not herein specifically shown which, in accordance with an aspect of the invention to be discussed hereinbelow, may selectively be removed and reinserted.

Inclusion of the series of spaced aperture pairs 24a—24a on extension tube 23 allows the overall length of the present invention to be adjusted. Where extension tube 23 is formed from aluminum, steel, or similar materials, implements such as tubing cutters or hacksaws may be used to cut extension tube 23 to a desired length. Thereafter the ends of extension tube 23 may be inserted into socket-forming extensions 25 and 26, with the aperture pairs nearest to each end aligned with the corresponding passages formed in the socketforming extensions 25 and 26. In this manner, the overall length of cutter 10 can be selected to fit the size of the stock to be severed, or to meet the preference of the workman using the cutter.

Should head assembly 11, extension tube 23, or handle assembly 21 become damaged, replacement of the damaged part may be accomplished without requiring replacement of the entire cutter by detaching the damaged part from extension tube 23 and replacing it with an undamaged part. Where a longer or shorter extension tube, or specially formed or configured extension tube may be desireable as, for example, one bent to vertically or horizontally offset head assembly 11 from handle assembly 21, cutter 10 may be disassembled to allow such special extension tube to be installed according to the aspects of the invention as discussed hereinabove.

Referring now to FIG. 5, a connecting sleeve 39 is illustrated which may be used to releasably join extension tube segments 40 and 41, thus making it possible to join a first extension tube segment attached to cutting head assembly 11 with a second extension tube segment attached to handle assembly 21.

Sleeve 39 is preferably sized and shaped to fit closely and telescopically over extension tube segments 40 and 41. The sleeve 39 has a pair of apertures extending radially therethrough (not herein specifically shown) to register with extension tube apertures 24 in the same fashion as hereinabove described with respect to socket-forming extensions 25 and 26. Bolts 42 may thereupon be inserted to secure segments 40 and 41 within sleeve 39. In this manner, individual extension tube segments may be combined to provide longer reach for cutting head assembly 11.

The cross-sectional shape of the extension tube to be used may be varied as, for example, by use of square tubing, so long as socket-forming extensions 25 and 26 are formed to fit said extension tube.

Although the present invention has been presented in the form of preferred embodiments thereof, it is to be understood that such embodiments are included by way of example only. It is expected that others will perceive variations which, while differing from the foregoing, do not depart from the spirit and scope of the invention as herein described and claimed.

I claim:

1. In a portable hand-powered apparatus for shearing of sheet stock, said apparatus comprising: a cutting head frame having an upper frame member and a lower frame member, said lower frame member being connected with said upper frame member; a pair of rotatable cutting wheels, each said wheel having a cutting edge formed about its outer periphery; means for mounting one of said cutting wheels to said upper frame member and the other said cutting wheel to said lower frame member, said mounting means being adapted to hold said cutting wheels proximate to each other in fixed, spatial relationship with said cutting edges vertically overlapping and slightly laterally offset to shear said sheet stock as said stock contacts said cutting wheels; and a handle; the improvement comprising coupling means respectively on said cutting head frame and handle; connecting means of substantially constant cross section removably connectable between said coupling means of said cutting head frame and handle, said coupling means of said cutting head frame and handle being of the same size to receive either end of said connector means; said connecting means having a plurality of attaching means comprising many anchoring apertures spaced longitudinally along said connecting means; said connecting means being severable at various selected severance points along the length to adjust the length thereof and leave new endmost anchoring apertures at the remaining ends of said connecting means; and retaining means adapted to releasably connect each end of said connecting means respectively to the coupling means of said cutting head frame and said handle through the endmost of said anchoring aperture means.

2. The apparatus as recited in claim 1 wherein said connecting means is a tubular means, and said anchoring apertures includes pairs of aligned apertures arranged in longitudinally-spaced relation along said tubular means to receive said retaining means.

3. The apparatus as recited in claim 2 or 1 wherein each of said retaining means includes passage means formed in each coupling means, said passage means being registrable with the endmost aperture means of said connecting means, and a retaining pin adapted to fit through and be secured in each of said passage means and said aperture means in said connecting means when said passage means and said aperture means are in register.

4. The apparatus as recited in claim 1 wherein said connecting means includes a plurality of connecting members of varying length but of substantially the same cross section throughout their lengths, each said member having an end selectively engageable with one of said coupling means and an opposite end connectable to an end of one of the other member, and additional coupling means for removably connecting the latter ends of said connecting members.

5. The apparatus as recited in claim 4 wherein said adjusting means further includes means to interconnect selected of said connecting means of varying length with one another.

6. The apparatus as recited in claim 4 wherein each of said coupling means has a socket which telescopes over either end of said connecting members, and said additional coupling means include a pair of passage means for receiving the shanks of anchoring pins which can pass through the endmost anchoring apertures of said connecting members.

7. The apparatus as recited in claim 6 wherein each of said connecting members is a tubular member with pairs of transversely aligned anchoring apertures along the length thereof.

8. The apparatus as recited in claim 1 wherein each of said coupling means includes a socket which telescope over an end of said connecting means.

9. The apparatus of claim 1 wherein said connecting means is a single tubular member extending between said cutting head frame and handle.

* * * * *